United States Patent
Joffe et al.

(10) Patent No.: US 9,614,616 B2
(45) Date of Patent: Apr. 4, 2017

(54) OPTICAL TIME DOMAIN REFLECTOMETER SYSTEMS AND METHODS USING WIDEBAND OPTICAL SIGNALS FOR SUPPRESSING BEAT NOISE

(71) Applicants: Daniel M. Joffe, Owens Crossroads, AL (US); Leif Sandstrom, Madison, AL (US); George Elliott Bekken, Madison, AL (US)

(72) Inventors: Daniel M. Joffe, Owens Crossroads, AL (US); Leif Sandstrom, Madison, AL (US); George Elliott Bekken, Madison, AL (US)

(73) Assignee: ADTRAN, INC., Huntsville, AL (US)

( * ) Notice: Subject to any disclaimer, the term of this patent is extended or adjusted under 35 U.S.C. 154(b) by 0 days.

(21) Appl. No.: 13/922,177

(22) Filed: Jun. 19, 2013

(65) Prior Publication Data
US 2014/0003821 A1     Jan. 2, 2014

Related U.S. Application Data

(60) Provisional application No. 61/661,705, filed on Jun. 19, 2012.

(51) Int. Cl.
*H04B 10/00* (2013.01)
*H04B 10/2507* (2013.01)
(Continued)

(52) U.S. Cl.
CPC ..... *H04B 10/2507* (2013.01); *G01M 11/3118* (2013.01); *H04B 10/071* (2013.01)

(58) Field of Classification Search
USPC ............................................ 398/9–14, 17–24
See application file for complete search history.

(56) References Cited

U.S. PATENT DOCUMENTS 5,000,568 A * 3/1991 Trutna, Jr. ......... G01M 11/3118
                                                    250/227.15
5,343,286 A   8/1994 Keeble et al.
(Continued)

OTHER PUBLICATIONS

U.S. Appl. No. 13/922,177, Agustin Bello.*
(Continued)

*Primary Examiner* — Agustin Bello
(74) *Attorney, Agent, or Firm* — Maynard Cooper & Gale, P.C.; Jon E. Holland

(57) ABSTRACT

A correlation optical time domain reflectometer (OTDR) provides a correlation sequence that is continuously transmitted along a fiber for testing the fiber for anomalies. Such continuous transmission can result in beat noise that degrades the quality of the measured returns. In this regard, each sample is composed of backscatter returns from many points along the fiber that arrive at the OTDR at the same time. When a subset of these returns have frequency differences that appear in the passband of the OTDR receiver, the constructive and destructive interference of these returns at the OTDR receiver can cause significant low-frequency beat noise in the OTDR signal. An optical transmitter is configured to transmit the correlation sequence through the fiber using a wideband optical signal such that the beat noise is suppressed within the passband of the OTDR receiver, thereby improving the quality of the returns measured by the OTDR.

25 Claims, 8 Drawing Sheets

(51) Int. Cl.
G01M 11/00 (2006.01)
H04B 10/071 (2013.01)

(56) References Cited

U.S. PATENT DOCUMENTS

| | | | |
|---|---|---|---|
| 5,771,250 A | 6/1998 | Shigehara et al. | |
| 5,864,413 A | 1/1999 | Feldman et al. | |
| 5,999,258 A * | 12/1999 | Roberts | H04B 10/07951 356/450 |
| 6,263,002 B1 * | 7/2001 | Hsu | H01S 5/146 372/20 |
| 6,708,004 B1 * | 3/2004 | Homsey | H04B 10/035 398/11 |
| 7,274,441 B2 * | 9/2007 | Payton | G01D 5/35383 356/73.1 |
| 7,809,279 B2 * | 10/2010 | Zhang | H04B 10/035 356/73.1 |
| 7,872,737 B2 * | 1/2011 | Zhang | G01M 11/3118 356/73.1 |
| 8,509,613 B2 * | 8/2013 | Chung | H04B 10/071 398/17 |
| 8,520,709 B2 * | 8/2013 | Baroni | H01S 5/10 372/29.016 |
| 8,526,824 B1 * | 9/2013 | Turner | G01M 11/3145 398/158 |
| 2003/0128354 A1 | 7/2003 | Fayer et al. | |
| 2006/0227315 A1 * | 10/2006 | Beller | G01S 7/4818 356/3 |
| 2007/0019956 A1 | 1/2007 | Sorin et al. | |
| 2007/0091297 A1 * | 4/2007 | Beller | G01M 11/3109 356/73.1 |
| 2007/0264012 A1 * | 11/2007 | Healey | H04B 10/071 398/13 |
| 2007/0268939 A1 * | 11/2007 | Cattellan | H01S 5/141 372/20 |
| 2008/0077343 A1 | 3/2008 | Johansson | |
| 2009/0027656 A1 | 1/2009 | Zhang et al. | |
| 2009/0028549 A1 * | 1/2009 | Zhang | H04B 10/035 398/16 |
| 2009/0257743 A1 | 10/2009 | Chung et al. | |
| 2011/0013904 A1 | 1/2011 | Khermosh et al. | |
| 2014/0003821 A1 * | 1/2014 | Joffe | H04B 10/2507 398/147 |

OTHER PUBLICATIONS

Gysel. et al., "Spectral Properties of Rayleigh Backscattered Light from Single-Mode Fibers Caused by a Modulated Probe Signal," IEEE Journal of Lightwave Technology, vol. 8, No. 4, Apr. 1990.

Shimizu, et al., "Characteristics and Reduction of Coherent Fading Noise in Rayleigh Backscattering Measurement for Optical Fibers and Components," IEEE Journal of Lightwave Technology, vol. 10, No. 7, Jul. 1992.

King, et al., "Development of a Coherent OTDR Instrument," IEEE Journal of Lightwave Technology, vol. LT-5, No. 4, Apr. 1987.

lzumita, et al., "Stochastic Amplitude Fluctuation in Coherent OTDR and a New Technique for Its Reduction by Stimulating Synchronous Optical Frequency Hopping." IEEE Journal of Lightwave Technology, vol. 15, No. 2, Feb. 1997.

lzumita, et al., "Fading Noise Reduction in Coherent OTDR," IEEE Photonics Technology Letters, vol. 4, No. 2, Feb. 1992.

Song, et al., "A Novel Multi-frequency Coherent OTDR for Fast Fading Noise Reduction," OFC/ NFOEC Technical Digest, OSA, 2012.

Kazama, et al., "Fading-noise suppressed OFDR using optical frequency comb source and tunable delay line," ECOC Technical Digest, OSA, 2011.

Thollabandi, et al., "Tunable OTDR Based on Direct Modulation of Self-Injection-Locked RSOA for In-Service Monitoring of WDM-PON," IEEE Photonics Technology Letters, vol. 20, No. 15, Aug. 1, 2008.

Chen, et al., "Widely Tunable SOA-based OTDR Employing a Cost-Effective Source Configuration," OFC/ NFOEC Technical Digest, OSA, 2012.

Nazarathy, et al., "Real-Time Long Range Complementary Correlation Optical Time Domain Reflectometer," Journal of Lightwave Technology, vol. 7, No. 1, Jan. 1989.

Shim, et al., "Demonstration of Correlation-Based OTDR for In-Service Monitoring of 64-Split TDM PON," OFC/ NFOEC Technical Digest, OSA, 2012.

Lee, et al., "Uncooled C-Band Wide-Band Gain Lasers with 32-Channel Coverage and—20-dBm ASE Injection for WDM-PON," IEEE Photonics Technology Letters, vol. 18, No. 5, Mar. 1, 2006.

Hemp, et al., "Critical Design Parameters for Engineering Broadly Tunable Asymmetric Multiple-Quantum-Well Lasers," IEEE Journal of Quantum Eelctronics, vol. 36, No. 8, Aug. 2000.

Park, et al., "Fault-Detection Technique in a WDM-PON," Optical Society of America, Optics Express vol. 15, No. 4, Feb. 2007.

International Search Report and Written Opinion issued by the United States Patent and Trademark Office as the International Searching Authority for International Application No. PCT/US2013/046658, entitled Optical Time Domain Reflectometer Systems and Methods Using Wideband Optical Signals for Suppressing Beat Noise; Copenheaver, Blaine (Nov. 29, 2013).

Agrawal, "Fiber-Optic Communication Systems," The Institute of Optics University of Rochester, John Wiley & Sons, 1992, pp. 38-41.

Dispersion (optics) in Wikipedia. Retrieved Nov. 8, 2016 from https//en.wikipedia.org/wiki/Dispersion(otics).

* cited by examiner

OPTICAL TIME DOMAIN REFLECTOMETER SYSTEMS AND METHODS USING WIDEBAND OPTICAL SIGNALS FOR SUPPRESSING BEAT NOISE

CROSS REFERENCE TO RELATED APPLICATION

This application claims priority to U.S. Provisional Application No. 61/661,705, entitled "Systems and Methods for Reducing Inter-Pulse Coherent Rayleigh Noise in Optical Time Domain Reflectometers" and filed on Jun. 19, 2012, which is incorporated herein by reference.

RELATED ART

In fiber-optic communication systems, optical signals are used to carry data sometimes across great distances. It is well known that optical signals typically provide significantly higher data rates than those enabled by electrical signals. However, anomalies along an optical fiber, such as degraded splices, can adversely affect the performance of optical communication. Thus, techniques have been developed to locate fiber anomalies so that the anomalies can be repaired in order to improve communication performance.

In particular, optical time domain reflectometers (OTDRs) for detecting optical fiber anomalies have been developed and successfully used. One type of OTDR transmits a pulse along an optical fiber. A portion of the light of the pulse is returned toward the transmitter from each point along the optical fiber. As will be well known to those skilled in the art, such returns are produced by scattering of the light (Rayleigh backscatter) all along length of the fiber and in some cases by localized reflections (Fresnel reflections) at particular points along the fiber. Herein, both these sorts of optical signal returns are collectively referred to as reflections. At an anomaly, such as a degraded splice, more attenuation may occur as light passes through the splice, and in some cases more light may be reflected at this point than at other points that are free of anomalies. The OTDR measures the light returned from points along the length of the fiber and detects anomalies based on the reflected light.

Further, the OTDR can also estimate the location of the detected anomaly based on reflection delay. In this regard, each point along the optical fiber corresponds to a particular delay measured from the time of transmission by the OTDR. That is, the further the location is from the OTDR, the longer it will take for a transmitted pulse to reach the location, reflect, and return to the OTDR. Thus, the OTDR measures the amount of delay between transmission of the pulse and reception of a reflection that may indicate the presence of an anomaly. The delay corresponds to the distance of an anomaly from the OTDR, and the OTDR estimates the distance of the detected anomaly from the OTDR based on such delay.

Unfortunately, there are several significant drawbacks associated with the foregoing OTDR. For example, a trade-off exists between resolution and range. In this regard, for better resolution, a more narrow pulse is desired. However, the signal is attenuated as it travels along the optical fiber limiting the useful range of the pulse. A longer pulse of any given amplitude has more light energy and, therefore, a longer range but degrades resolution.

In another type of OTDR, often referred to as a correlation OTDR, there is less of a trade-off between resolution and range because in these systems the parameter that controls range can be varied independently from the parameter that affects resolution. In a correlation OTDR, a correlation sequence (e.g., a pseudo noise (PN) sequence) is transmitted along the optical fiber instead of a pulse. The PN sequence that reflects from the optical fiber is correlated with a delayed version of the transmitted PN sequence to detect the presence of anomalies along the fiber.

Noise in the optical channel affects the quality of the OTDR returns and ultimately the OTDR test results. Techniques for improving the quality of the optical returns in an OTDR system are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to systems and methods for reducing beat noise in correlation optical time domain reflectometers ("correlation OTDRs"). As described above, a correlation OTDR provides a correlation sequence (e.g., EN sequence) that is continuously transmitted along an optical fiber during testing. Such continuous transmission can result in beat noise that degrades the quality of the measured returns. In this regard, each sample is composed of backscatter returns from many points along the fiber that arrive at the OTDR at the same time. When a subset of these returns have frequency differences that appear in the passband of the OTDR receiver, the constructive and destructive interference of these returns at the OTDR receiver can cause significant low-frequency beat noise in the OTDR signal. Increasing the spectral width of the transmitted signal reduces the impact of beat-notes in the OTDR receiver by spreading the power of the beat-notes outside of the receiver passband and suppressing in-band notes via averaging.

Figure 1:
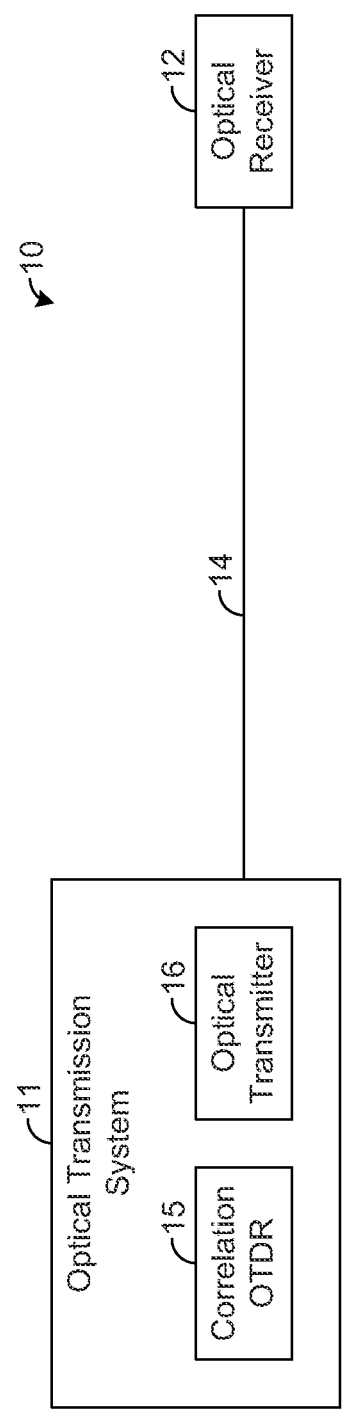
FIG. 1 is a block diagram illustrating an embodiment of a communication system in which an optical transmission system has a correlation OTDR system for unobtrusively detecting anomalies of an optical fiber while payload data is communicated across the fiber.

FIG. 1 depicts a communication system 10 having an optical transmission system 11 that transmits optical signals to an optical receiver 12 via an optical fiber 14. The transmission system 11 has a correlation OTDR 15 and an optical transmitter 16 coupled to a fiber 14. The OTDR 15 is configured to test the fiber 14 and unobtrusively detect anomalies, such as degraded splices, along the optical fiber 14 via correlation measurements while payload data is being communicated across the fiber 14.

Figure 2:
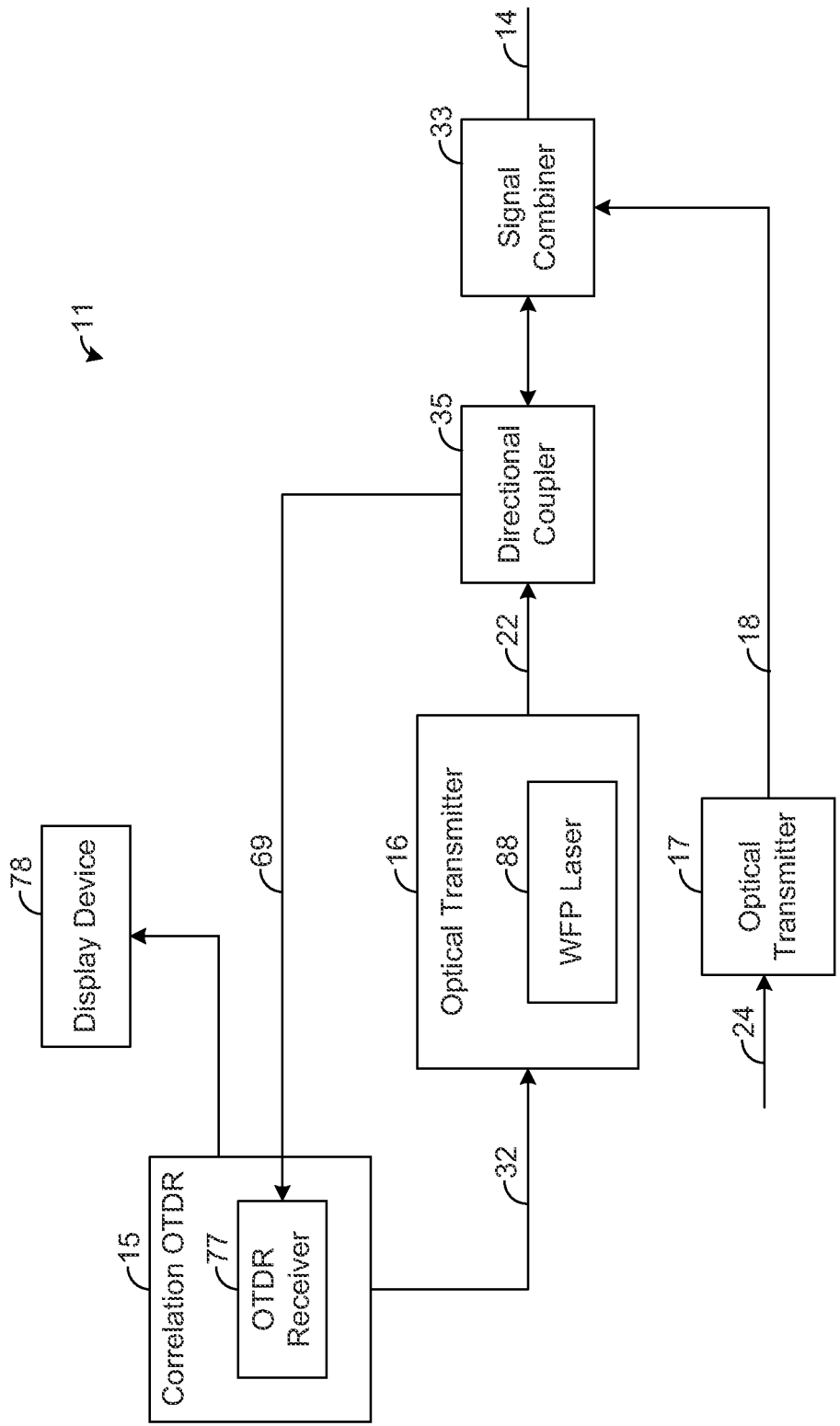
FIG. 2 is a block diagram illustrating an embodiment of an optical transmission system, such as is depicted by FIG. 1.

FIG. 2 depicts an embodiment of the optical transmission system 11. As shown by FIG. 2, the system 11 comprises an optical transmitter 17 that is configured to transmit, across the optical fiber 14, an optical data signal 18 carrying payload data from a received digital data signal 24. The system 11 also comprises an optical transmitter 16 that is configured to transmit, across the optical fiber 14, an optical OTDR signal 22 carrying a correlation sequence (e.g., EN sequence, such as an M sequence) defined by an OTDR signal 32 from the OTDR 15. In this regard, each transmitter 16 and 17 is configured to convert its respective input signal 24 and 32 from the electrical domain to the optical domain for transmission through the fiber 14. To enable simultaneous transmission of the optical signals 18 and 22 through the fiber 14, the optical transmission band or spectrum of the optical data signal 18 is preferably different than the optical transmission band of the optical OTDR signal 22 so that these signals 18 and 22 can be separated via conventional wavelength filtering techniques.

As shown by FIG. 2, a directional coupler 35 and a signal combiner 33 are coupled between the optical fiber 14 and the OTDR transmitter 16. The signal combiner 33 is also coupled between the optical fiber 14 and the optical transmitter 17. The signal combiner 33 combines the optical signals 18 and 22 such that they both propagate through the fiber 14 toward the optical receiver 12. The signal combiner also blocks light from the transmitter 17, and other optical sources not related to the CTDR from reaching the OTDR 15. The optical receiver 12 detects the optical data signal 18 and further processes the payload data carried by such signal 18 as may be desired.

Note that various configurations of the directional coupler 35 are possible. As an example, the directional coupler 35 may be implemented as a conventional circulator. In another embodiment, the directional coupler 35 may be implemented as a combination of an isolator and a splitter. In yet other embodiments, other types of directional couplers 35 may be used.

During transmission, portions of the optical OTDR signal 22 reflect back toward the optical transmitter 16 as it travels along the optical fiber 14. The fraction of the optical OTDR signal 22 that is reflected at each location is affected by normal backscattering and by line anomalies, such as degraded splices. The directional coupler 35 receives from the fiber 14 an optical signal 69, referred to hereafter, as the "reflected optical signal," comprising the reflections of the optical OTDR signal 22 as it travels along the fiber 14. The directional coupler 35 transmits the reflected optical signal 69 to a receiver 77 of the correlation CTDR 15, which converts the optical signal reflections to digital OTDR samples defining a sequence of digital values.

The receiver 77 also performs known signal processing in an effort to remove noise and increase the quality of the received signal. In this regard, the optical passband of the receiver 77 overlaps the optical transmission band of the optical transmitter 16 such that light within the optical transmission band of the optical transmitter 16 is received by the receiver 77. The receiver 77 has circuitry that processes the received signal after it is converted from the optical domain to the electrical domain.

Figure 3:
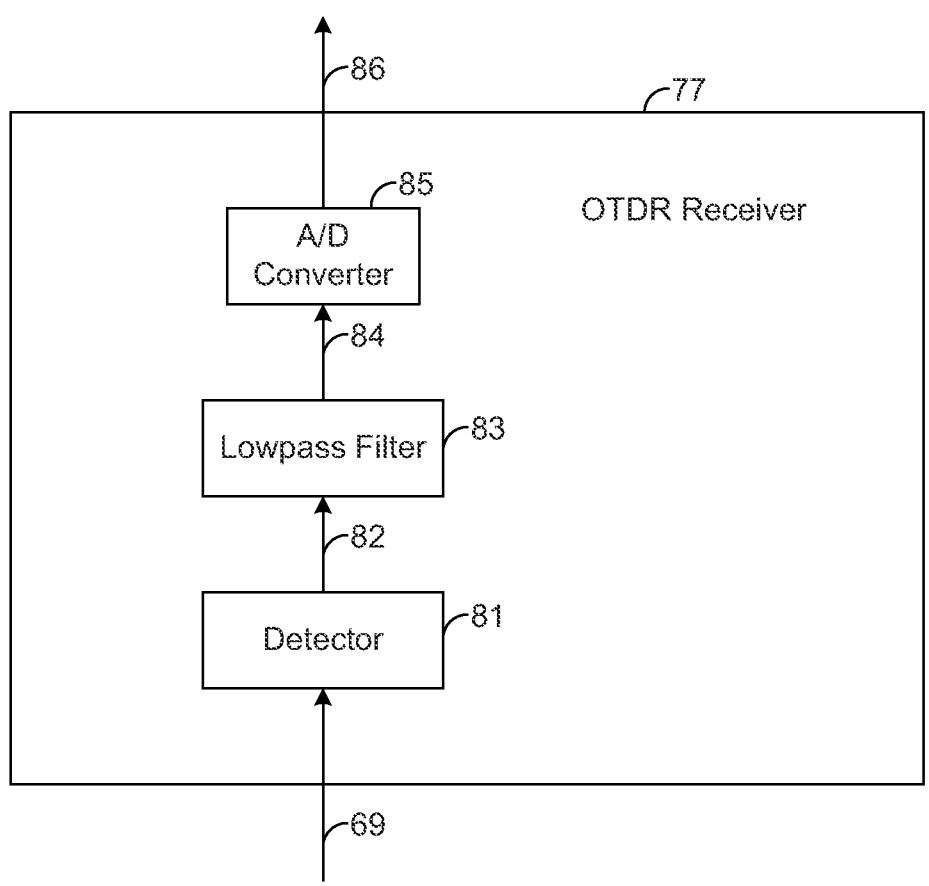
FIG. 3 is a block diagram illustrating an embodiment of an OTDR receiver, such as is depicted by FIG. 2.

Specifically, as shown by FIG. 3, the receiver 77 has a detector 81 that receives the reflected optical signal 69 and converts the optical signal 69 to an analog electrical signal 82. A low pass filter 83 filters the analog signal 77 in order to substantially remove high frequency noise. The width of the receiver passband can be selected based on typical design considerations and tradeoffs. In this regard, it is generally desirable for the passband to be sufficiently large to preserve the required resolution from the transmitted correlation sequence. However, reducing the size of the passband generally removes more noise by increasing the number of frequency components that are suppressed by the filtering. The low pass filter 83 provides a filtered signal 84, and an analog-to-digital (A/D) converter 85 converts the analog signal 84 to digital samples 86.

Note that transmitting the correlation sequence with a wider optical transmit spectrum, as described herein, has the effect of spreading the power of the beat noise across a wider bandwidth such that more power from the beat noise is outside of the receive filter's passband. That is, the beat noise is spread across a wider bandwidth such that the average beat noise in the frequency components that pass through the filter 83 is less. Thus, the filtering performed by the low pass filter 83 removes beat noise to a greater extent than in an embodiment having a more narrow optical transmit spectrum.

Through techniques known in the art, the correlation OTDR 15 has a bank of correlators (not shown) that correlate the digital samples 86 with a delayed version of the transmitted correlation sequence. Each correlator corresponds to a different point along the fiber 14 and is implemented as a multiplier followed by an accumulator. In general, each correlator provides a value that is indicative of the amount of light reflected from the corresponding location along the fiber and, thus, indicates whether an anomaly exists at such corresponding location. Specifically, if the correlated values accumulate to an unexpected value, then it is likely that an anomaly exists at the corresponding fiber location. As shown by FIG. 2, the correlation OTDR 15 is coupled to a display device 78 and displays information indicative of the detected anomalies and the correlation results for analysis by a user. Commonly-assigned U.S. patent application Ser. No. 12/783,999, entitled "Systems and Methods for Unobtrusively Testing Optical Fibers" and filed on May 20, 2010, which is incorporated herein by reference, describes embodiments of a correlation OTDR.

As described above, each OTDR sample 86 is composed of returns from multiple points along the fiber 14 that arrive at the OTDR receiver 77 at the same time. Such returns have different phase relationships resulting in constructive and destructive interference that can cause significant beat noise, which is temporal in nature or, in other words, varies over time. It is believed that increasing the spectral width of the OTDR signal at the optical transmitter 16 can help to reduce the effects of this beat noise. In this regard, the wide spectrum signal has less power per unit of bandwidth, so the power of the beat notes contained within the limited receiver bandwidth is also less. Based on experimental results, effective beat noise suppression has been observed using an OTDR signal having a spectral width of about 20 nanometers, and suppression of the beat noise generally improves with greater spectral width.

In one embodiment, the optical transmitter 16 is configured to transmit a wideband optical OTDR signal 22 having a spectral width of at least about 20 nm. Such a large optical spectral width helps to suppress beat noise in the samples 86 measured by the OTDR receiver 77. If desired, the spectral width of the optical OTDR signal 22 may be further increased in order to improve beat noise suppression.

There are various types of transmitters 16 that can be used to generate a wideband optical signal 22. In one embodiment, the optical transmitter 16 comprises a conventional wideband Fabry-Perot (WFP) laser 88, as shown by FIG. 2. A WFP laser 88 is a Fabry-Perot (FP) laser that is specifically designed to have a relatively large optical transmission band, such as about 20 to 60 nm or more. In this regard, a WFP laser 88 has a resonant cavity that is designed as an asymmetric quantum well structure such that it provides optical gain across a wider spectrum relative to a typical FP laser. A WFP laser typically provides gain across a spectrum of about 20 nm or greater. In addition, the resonant cavity of a WFP laser is often longer (e.g., about two to three times longer) than the resonant cavity of an FP laser. Such a longer resonant cavity has the effect of providing more output power and pushing the resonant modes of the WFP laser closer together.

A WFP laser 88 may also have an asymmetric mirror structure. In such embodiment, a mirror is located at each end of the resonant cavity. The mirror at the back of the resonant cavity has a relatively high reflectivity, and the mirror at the front of the resonant cavity has a lower reflectivity, such as close to 1% reflectivity. The lower quality mirror at the front of the resonant cavity facilitates optical injection locking, as will be described below, when a seed signal is injected into the resonant cavity.

In the past, WFP lasers 88 have been used as tunable lasers, generally referred to as injection-locked FP lasers, that tune to the wavelength of a seed signal received by such laser. Accordingly, an injection-locked FP laser has a relatively wide optical transmission band across which it can be tuned, but the laser actually transmits with a narrow optical spectrum that depends on the wavelength of the seed signal. That is, the laser is capable of transmitting across a wide optical transmission band, but it is designed to lock onto the wavelength of the seed signal and transmit a signal with a narrow spectral width at the wavelength of the seed signal, provided that the wavelength of the seed signal is within the optical transmission band of the injection-locked FP laser. A wide optical transmission band provides an injection-locked FP laser with greater capacity regarding the range of wavelengths onto which it can lock.

Figure 4:
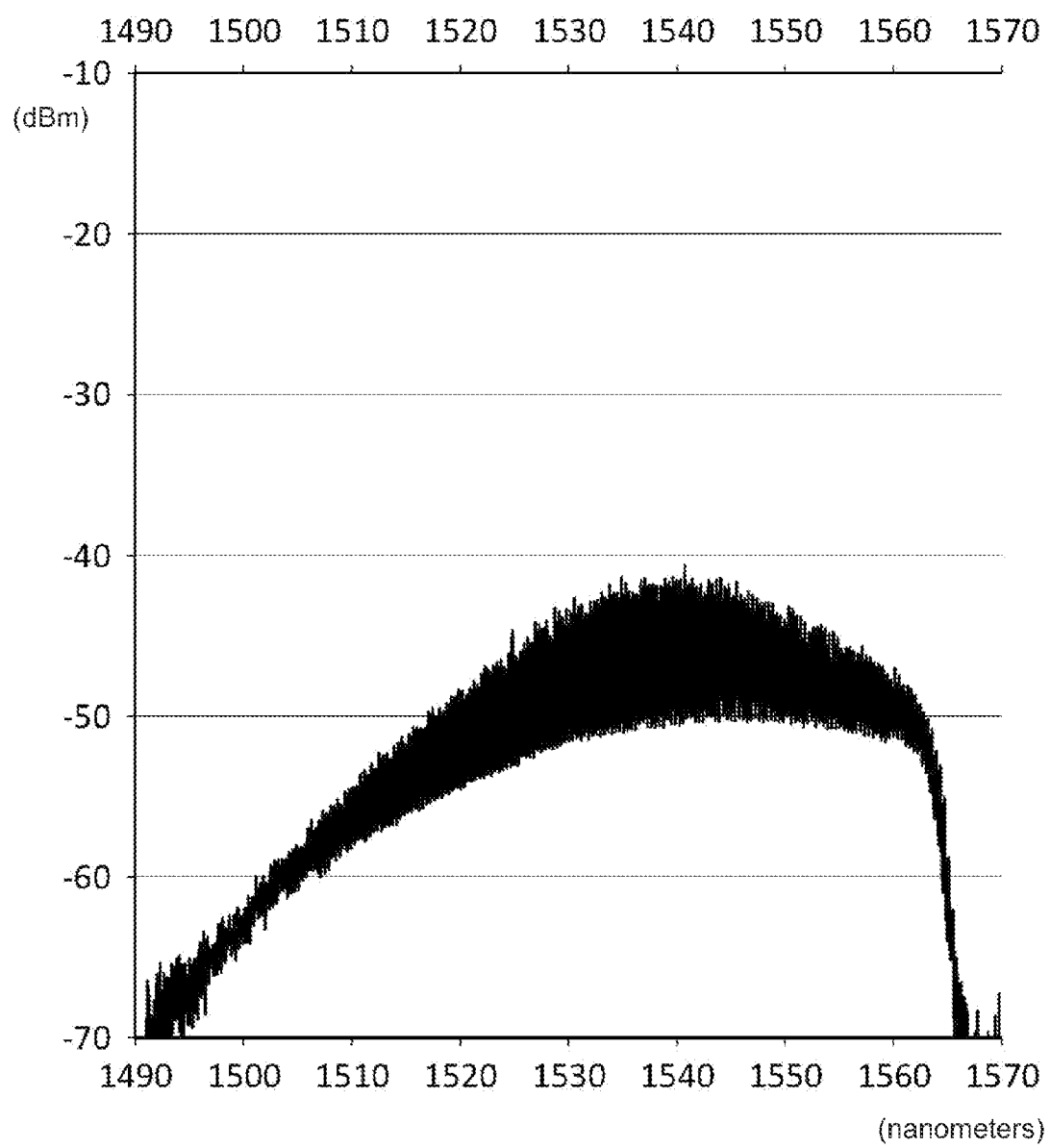
FIG. 4 is a graph of power versus wavelength for a signal output from a wideband Fabry-Perot laser that is prevented from optical injection locking.
Figure 5:
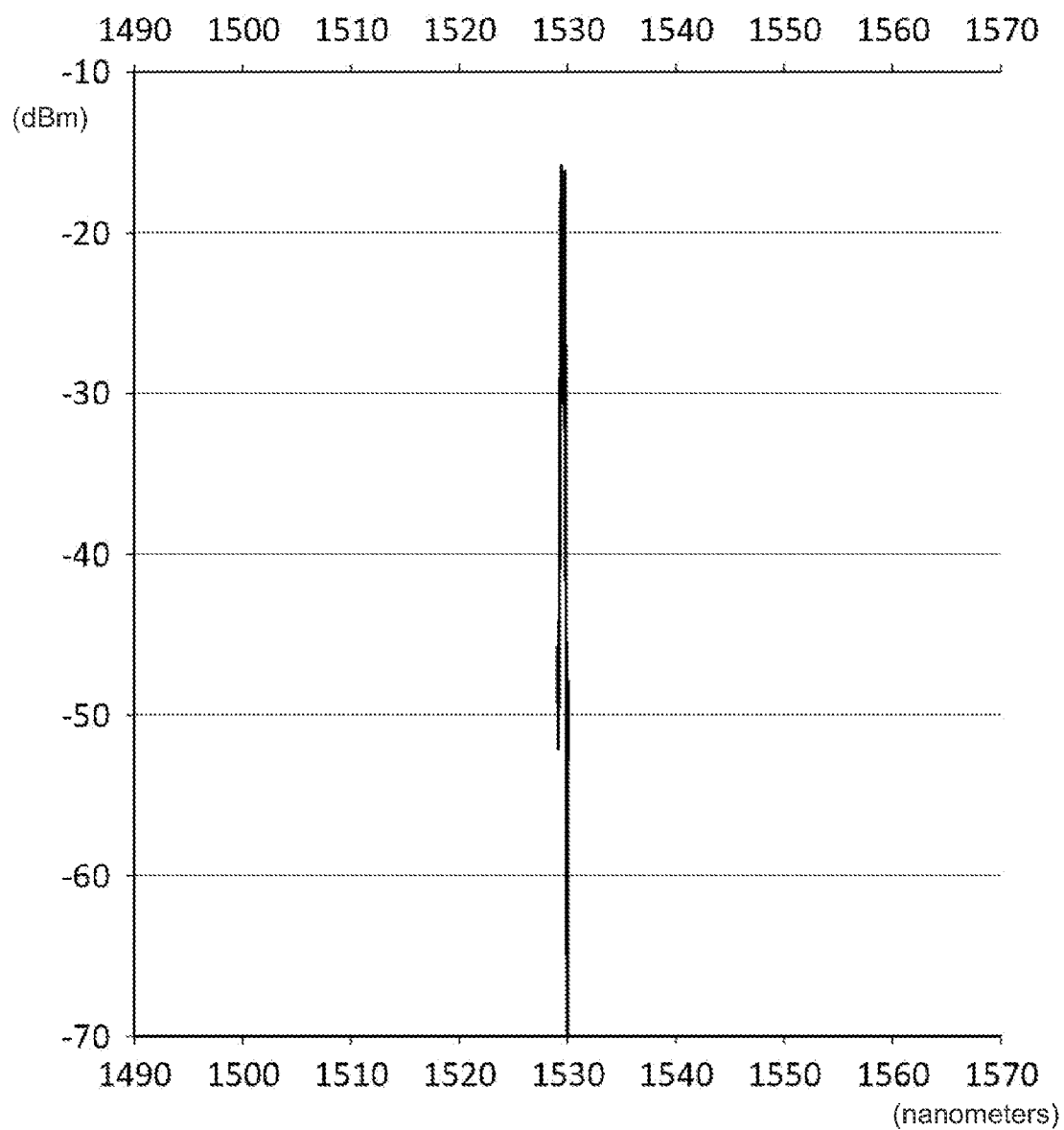
FIG. 5 is a graph of power versus wavelength for a signal output from an injection-locked Fabry-Perot laser.

In the embodiment depicted by FIG. 2, the directional coupler 35 is configured to block light from the fiber 14 from reaching the WFP laser 88, thereby preventing the laser 88 from optical injection locking. Such a free-running WFP laser 88 provides a wideband optical signal, such as about 20 nm or greater. For example, FIG. 4 shows one output spectrum from a conventional WFP laser 88 for which optical injection locking is prevented. In other embodiments, other spectra are possible. FIG. 5 shows the output spectrum from the same WFP laser 88 when a seed signal of close to about 1530 nm is input to the laser 88 thereby tuning it to the wavelength of the seed signal. As can be seen by comparing FIGS. 3 and 4, preventing the WFP laser 88 from optical injection locking has the effect of significantly increasing the spectral width of the output signal.

Although the features described above for a WFP laser 88, such as a longer resonant cavity and an asymmetric mirror structure, are found in many conventional WFP lasers, it is unnecessary for the WFP laser 88 to incorporate all such features. Indeed, it is possible for a WFP laser 88 to be configured to transmit a sufficiently wide spectrum with cavity lengths found in many conventional FP lasers and without an asymmetric mirror structure. Any light source capable of producing a sufficiently wide spectrum to suppress beat noise in the passband of the OTDR receiver 77 may be used to transmit the optical signal 22 through the fiber 14. Indeed, FIGS. 5-7 depict various embodiments in which other types of light sources are used to transmit the optical signal 22.

Figure 6:
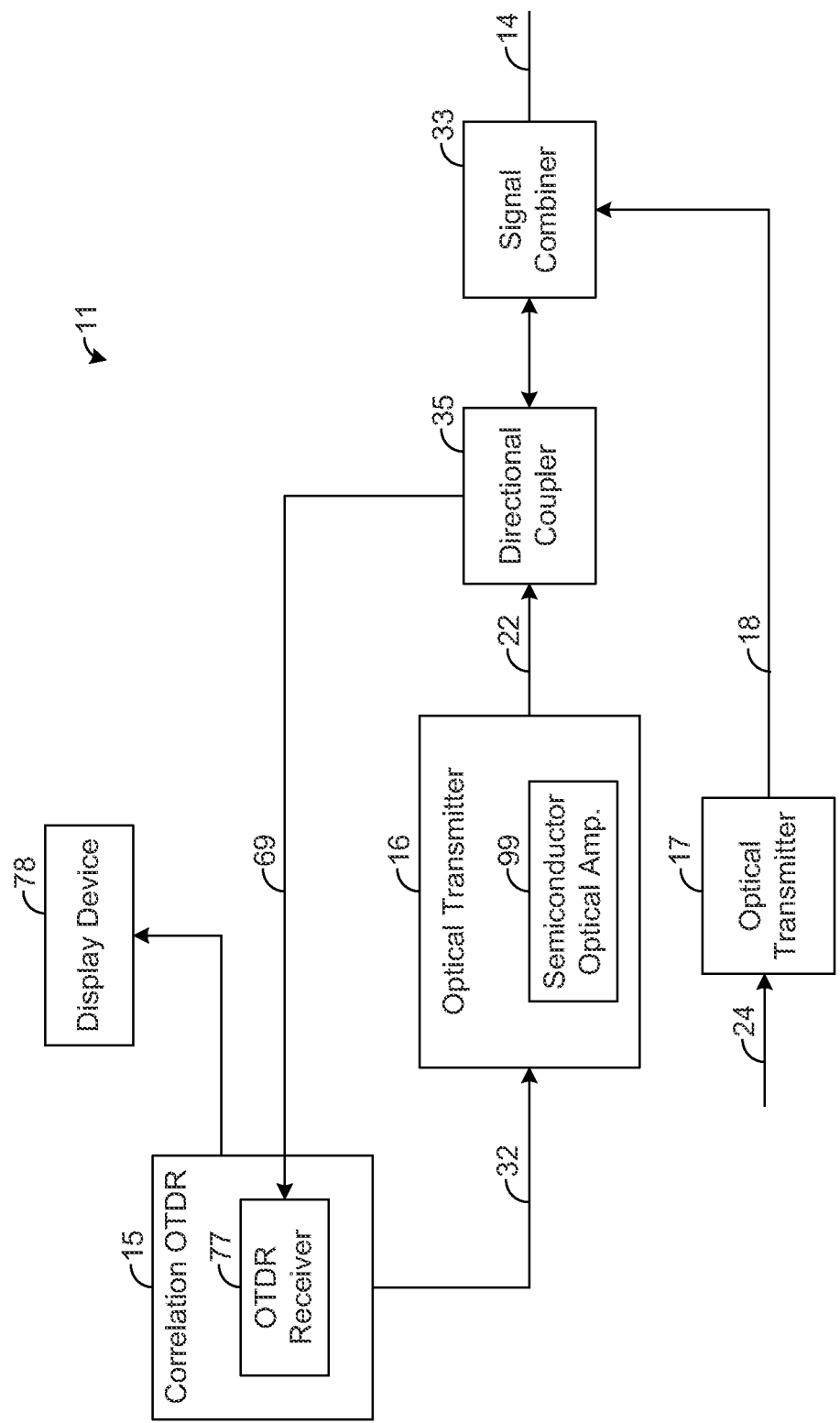
FIG. 6 is a block diagram illustrating an embodiment of an optical transmission system, such as is depicted by FIG. 1.

In this regard, FIG. 6 depicts an embodiment in which the optical transmitter 16 has a semiconductor optical amplifier (SOA) 99. Such an SOA can be biased and modulated to produce a wideband optical signal 22 using the electrical OTDR signal 32 as input.

Figure 7:
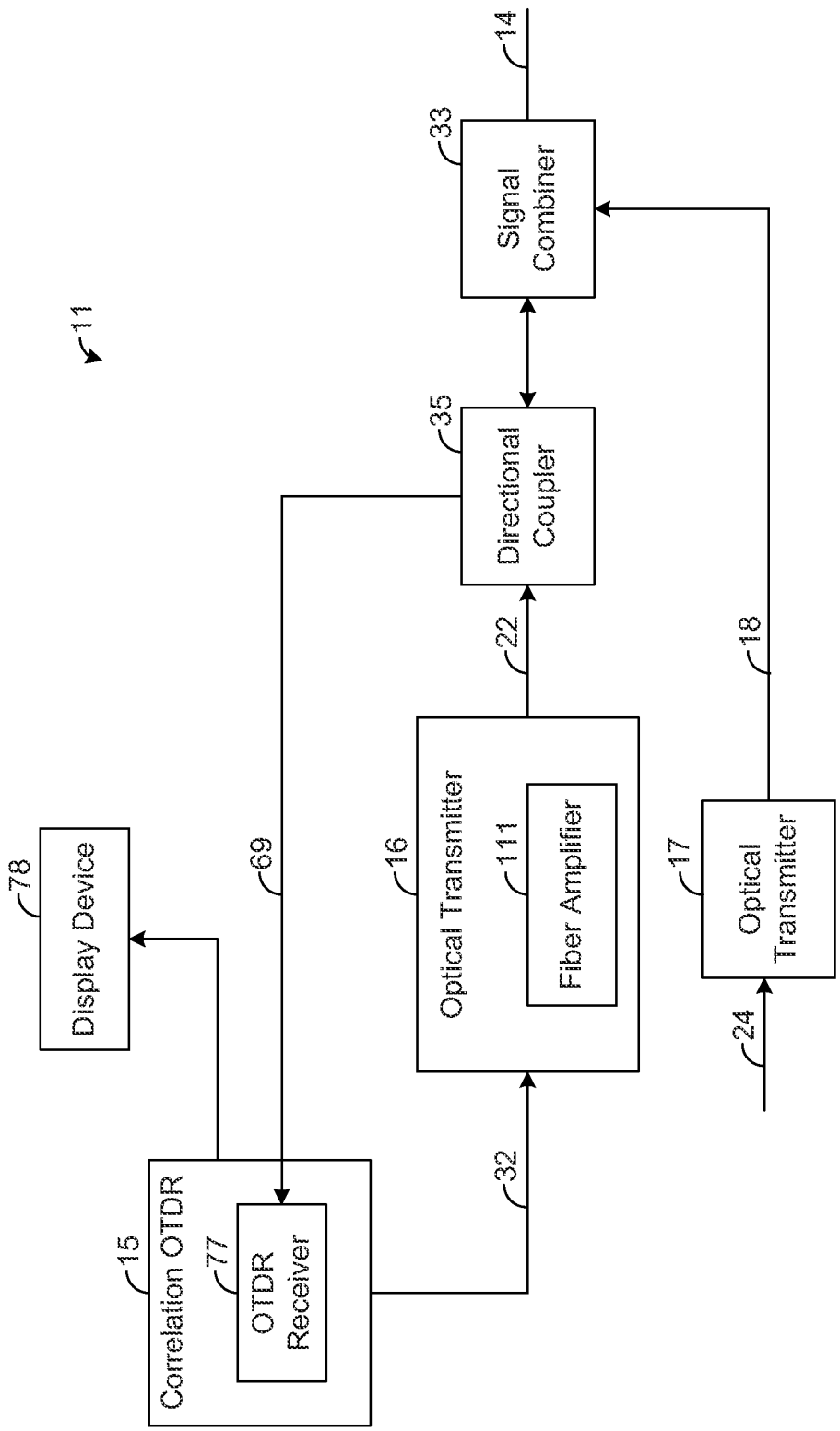
FIG. 7 is a block diagram illustrating an embodiment of an optical transmission system, such as is depicted by FIG. 1.

FIG. 7 depicts another embodiment in which the optical transmitter 16 has a fiber amplifier 111, such as an erbium-doped fiber amplifier (EDFA), for providing a wideband optical signal 22 based on the electrical OTDR signal 32. In such embodiment, optical pumping and a modulation technique with sufficient signal bandwidth, such as external modulation, may be used to output a wideband optical signal 22.

Figure 8:
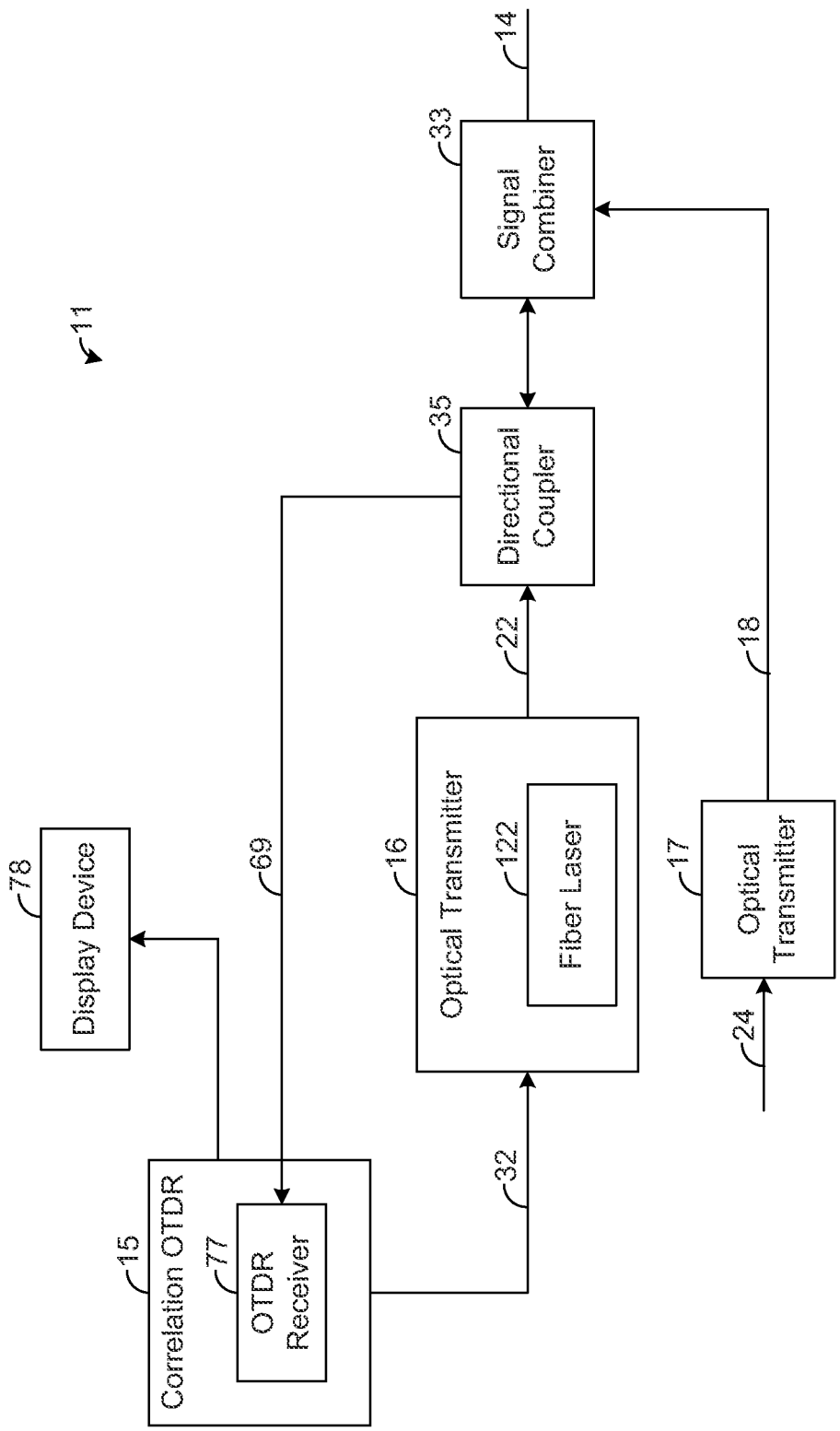
FIG. 8 is a block diagram illustrating an embodiment of an optical transmission system, such as is depicted by FIG. 1.

FIG. 8 depicts an embodiment in which the optical transmitter 16 has a fiber laser 122 for generating a wideband optical signal 22 based on the electrical OTDR signal 32. A fiber laser 122 generally comprises a fiber amplifier with fiber-bragg gratings (mirrors) etched into the fiber at each end of the gain medium, which is a doped portion of the fiber. As with the amplifier 111, optical pumping and a modulation technique with sufficient signal bandwidth, such as external modulation, may be used to output a wideband optical signal.

In yet other embodiments, other types of light sources may be used by the optical transmitter 16 to produce an optical OTDR signal 22 having a wide spectrum, such as about 20 nm or more. An operation and use of the transmission system 11 will be described in detail below with particular reference to FIG. 2.

In this regard, the optical transmitter 17 receives a data stream 24 having payload data for transmission to the optical receiver 12 (FIG. 1). Based on such data stream 24, the optical transmitter 17 transmits an optical data signal 18.

In addition, the optical transmitter 16 receives an OTDR signal 32, which is a digital signal defining a correlation sequence for probing the fiber 14. Based on such signal 32, the optical transmitter 16 transmits an optical OTDR signal 22, which is combined with the optical data signal 18 by the signal combiner 33 for transmission through the fiber 14. The optical transmitter 16 is configured such that the optical OTDR signal 22 has a spectral width of at least 20 nm.

As the optical signal 22 propagates along the fiber 14, a portion of the signal 22 is returned toward the transmitter 16 from each point along the optical fiber 14. Such returns pass through the directional coupler 35 and are received by the OTDR receiver 77, which samples the returns to provide digital samples 86 that are analyzed by the correlation OTDR 15 in order to detect anomalies along the fiber 14. Having a sufficiently wide spectrum, such as about 20 nm or more, spreads the power of the beat noise in the OTDR return signal 69 enough to significantly suppress beat noise in the measured returns at the OTDR receiver 77. Generally, having a larger spectral width for the optical signal 22 helps to better suppress the beat noise within the receiver passband.

Now, therefore, the following is claimed:
1. A communication system, comprising:
   an optical fiber;
   an optical transmitter configured to receive an optical time domain reflectometer (OTDR) signal defining a correlation sequence and to convert the OTDR signal into a wideband optical signal, the optical transmitter further configured to transmit the wideband optical signal through the optical fiber; and a correlation OTDR having a receiver configured to receive and filter optical returns of the wideband optical signal from the fiber, the correlation OTDR configured to correlate samples of the optical returns with the correlation sequence, wherein the wideband optical signal at an output of the optical transmitter has a spectral width sufficiently large for suppressing in the returns beat noise that is within a passband of the receiver, and wherein the wideband optical signal simultaneously spans across the entire spectral width at the output of the optical transmitter.

2. The system of claim 1, wherein the spectral width is at least 20 nanometers.

3. The system of claim 1, wherein the correlation OTDR is configured to detect an anomaly along the fiber based on the optical returns.

4. The system of claim 3, further comprising a display device coupled to the correlation OTDR, wherein the correlation OTDR is configured to display, via the display device, information indicative of the anomaly.

5. The system of claim 1, further comprising a directional coupler coupled between the optical transmitter and the optical fiber.

6. The system of claim 5, wherein the optical transmitter comprises a wideband Fabry-Perot laser, and wherein the directional coupler is configured to block the optical returns from reaching the wideband Fabry-Perot laser.

7. An optical transmission system for suppressing beat noise, comprising:

an optical transmitter configured to transmit a wideband optical signal defining a correlation sequence along an optical fiber, the wideband optical signal having a spectral width of at least 20 nanometers at an output of the optical transmitter, wherein the wideband optical signal simultaneously spans across the entire spectral width at the output of the optical transmitter; and a correlation optical time domain reflectometer (OTDR) configured to receive and filter optical returns of the wideband optical signal, the correlation OTDR further configured to correlate samples of the optical returns with the correlation sequence.

8. The system of claim 7, wherein the correlation OTDR is configured to detect an anomaly along the fiber based on the optical returns.

9. The system of claim 8, further comprising a display device coupled to the correlation OTDR, wherein the correlation OTDR is configured to display, via the display device, information indicative of the anomaly.

10. The system of claim 7, wherein the optical transmitter comprises a wideband Fabry-Perot laser.

11. The system of claim 10, further comprising a directional coupler coupled between the optical transmitter and the optical fiber, wherein the directional coupler is configured to block the returns from reaching the wideband Fabry-Perot laser.

12. The system of claim 7, wherein the optical transmitter comprises a semiconductor optical amplifier.

13. The system of claim 7, wherein the optical transmitter comprises a fiber amplifier.

14. The system of claim 7, wherein the optical transmitter comprises a fiber laser.

15. A communication method, comprising:

transmitting a wideband optical signal with an optical transmitter through an optical fiber, the wideband optical signal defining a correlation sequence;

receiving optical returns of the wideband optical signal from the optical fiber;

filtering the optical returns via a receiver; and correlating samples of the optical returns with the correlation sequence, wherein the wideband optical signal at an output of the optical transmitter has a spectral width sufficiently large for suppressing in the optical returns beat noise within a passband of the receiver, and wherein the wideband optical signal simultaneously spans across the entire spectral width at the output of the optical transmitter.

16. The method of claim 15, wherein the spectral width is at least 20 nanometers.

17. The method of claim 15, further comprising detecting an anomaly along the optical fiber based on the correlating.

18. The method of claim 15, further comprising displaying information indicative of the detected anomaly.

19. The method of claim 15, wherein the transmitting is performed via a wideband Fabry-Perot laser, and wherein the method comprises preventing the wideband Fabry-Perot laser from optical injection locking.

20. The method of claim 19, wherein the preventing comprises blocking the optical returns from reaching the wideband Fabry-Perot laser.

21. The method of claim 15, wherein the passband is more narrow than the spectral width.

22. The system of claim 1, wherein the passband is more narrow than the spectral width.

23. The system of claim 7, wherein the correlation OTDR has a filter configured to filter the optical returns, and wherein a passband of the filter is more narrow than the spectral width.

24. The system of claim 1, wherein the spectral width is at least 20 nanometers.

25. The method of claim 15, wherein the spectral width is at least 20 nanometers.

* * * * *